United States Patent
Bleckert et al.

(10) Patent No.: US 7,383,044 B2
(45) Date of Patent: Jun. 3, 2008

(54) METHOD AND DATABASE FOR PERFORMING A PERMISSION STATUS CHECK ON A MOBILE EQUIPMENT

(75) Inventors: Peter Nils Olov Bleckert, Uppsala (SE); Philip Hodges, Victoria (AU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 143 days.

(21) Appl. No.: 11/197,810

(22) Filed: Aug. 5, 2005

(65) Prior Publication Data

US 2007/0032232 A1 Feb. 8, 2007

(51) Int. Cl.
*H04Q 7/20* (2006.01)
(52) U.S. Cl. ............. 455/433; 455/435.1; 455/411
(58) Field of Classification Search ........... 455/433, 455/435.1, 411
See application file for complete search history.

(56) References Cited

U.S. PATENT DOCUMENTS

| | | | | |
|---|---|---|---|---|
| 6,665,529 | B1* | 12/2003 | Mills, Jr. | 455/411 |
| 6,957,061 | B1* | 10/2005 | Wright | 455/411 |
| 2005/0159157 | A1* | 7/2005 | Bajko | 455/435.1 |
| 2005/0287990 | A1* | 12/2005 | Mononen et al. | 455/411 |
| 2006/0128362 | A1* | 6/2006 | Bae et al. | 455/411 |

* cited by examiner

*Primary Examiner*—Joseph Feild
*Assistant Examiner*—S. Smith

(57) ABSTRACT

A method and a central subscriber database are provided for performing a permission status check in a mobile network. A mobile station is identified using subscription related identification data and equipment based identification data. When a determination is made that current subscription related identification data and current equipment based identification data have not been previously correlated a validation procedure is performed.

20 Claims, 9 Drawing Sheets

METHOD AND DATABASE FOR PERFORMING A PERMISSION STATUS CHECK ON A MOBILE EQUIPMENT

FIELD OF INVENTION

This invention relates to a method for performing a permission status check on mobile equipment within a wireless communication network. More particularly, the present invention relates to performing a permission status check using a centralized subscriber database having access to both mobile equipment identification data as well as subscriber identification data.

BACKGROUND

With the advent of mobile stations and wireless communication systems, mobile subscribers are granted location independent mobility with a number of other features and applications. One such feature is a detachable subscriber identification module identifying a particular mobile subscriber or associated subscription account. With a mobile station having a detachable subscriber identification module, such as a Subscriber Identity Module (SIM) in a Global System for Mobile (GSM) communication system, a mobile subscriber conveniently exchanges or changes his mobile equipment by merely removing his SIM card from the old mobile equipment and re-inserting it into the new mobile equipment. As a result, the mobile user no longer has to rely on a customer support or technicians to switch his mobile equipment from the old equipment to the new equipment while still retaining the same telephone number along with his personal settings and user information. However, with the physical separation between a subscriber identity module (SIM) identifying a particular mobile subscriber and particular mobile equipment providing wireless communications, two different identification data are needed for properly validating the mobile subscriber (or subscription) as well as the associated mobile equipment within the wireless communications network. As an illustration, a mobile equipment within a GSM network for communicating voice and a General Packet Radio System (GPRS) network for communication data is identified using an International Mobile Equipment Identification (IMEI) as standardized by the 3$^{rd}$ Generation Partnership Project (3GPP) Standard. Separately, as discussed above, mobile subscriber identification data or subscription data are identified using an International Mobile Subscriber Identity (IMSI) as further standardized by the GSM Standard, or, alternatively, using an Universal Mobile Subscriber Telephony System (UMTS) SIM (USIM), as standardized by the 3GPP Standard.

To determine whether mobile equipment is permitted within a particular mobile communication network, a permission status check on the mobile equipment needs to be performed. A permission status check performed on an IMEI as identification data for particular mobile equipment may be referred to as IMEI check. Such a permission status check is performed for a various reasons. One such reason may be to detect stolen mobile equipment. It may also be to detect virus infected mobile equipment which should not be granted access to a mobile network. The permission status check could also be used for performing "type approval" in order to identify mobile equipment not approved for use within a particular mobile network for technical, regulatory or compatibility reasons. A regulatory reason may be to "type approve" a particular terminal type as to not disturb other technical installations. Another technical reason may be to approve a particular terminal as to properly cooperate with existing network equipment within a mobile network.

The IMEI check for conducting the above described permission status check may be performed using a mobility management component in a Visitor Location Register (VLR) within the GSM network architecture or in a Serving GPRS Support Node (SGSN) within the GPRS network architecture. More specifically, an IMEI check is performed during a call control procedure for a call setup in a VLR serving a particular mobile station within a GSM network or, during a session management procedure, for a location area update, or for an attach procedure in an SGSN serving that mobile station within a GPRS network. An IMEI check may be further performed according to one or more rules defined by a serving SGSN or VLR further specifying when or how often an IMEI check needs to be performed for a served mobile station.

Reference is now made to FIG. 1 which is a block diagram illustrating a network architecture for GSM/GPRS networks which may be used in accordance with the above described permission status check procedures. Such a mobile network (MN) 5 comprises a mobile station (MS) 1, which comprises mobile equipment (ME) 11 and subscriber identity module (SIM) or UMTS SIM (USIM) 12. The MS 1 is connectable to a serving core network (CN) 3 via a radio network (RN) 2. One skilled in the art would understand that such a radio network would include base station transceivers (BTSs, not shown in FIG. 1) and base station controllers (BSCs, not shown in FIG. 1) for providing wireless communication links to the MS 1. The core network (CN) 3 further includes a Mobile Services Switching Center & Visitor Location Register (MSC/VLR, collectively herein after also referred to as the MSC) for switching voice calls and Serving GPRS Support Node (SGSN) for switching packets or data for the serving MS 1. Even though an MSC provides voice connection for a GSM system and an SGSN provides packet or data connection within a GPRS system, the MSC and SGSN 31 are illustrated as being co-located and residing on a single platform in FIG. 1. However, one skilled in the art would understand that MSC (including VLR) and SGSN could easily be located as two separate network nodes and independently functioning and interacting with the RN 2. The CN 3 is, in turn, connected to other Public Land Mobile Network (PLMN) or other Public Switched Telephone Network (PSTN) 4 for communicating with other networks, terminals and destinations.

To provide permission status check and subscriber validation process, the core network 3 further includes two different databases—an Equipment Identity Register (EIR) 32 as an equipment related database and a Home Location Register or Home Subscriber Server (HLR/HSS) 33 as a subscriber related database. The EIR 32 stores the IMEI data along with the associated permission status for the ME 11. The permission status may be requested by the MSC/SGSN 31 as described above using permission status request signals sent via an interface between MSC/SGSN 31 and EIR 32. The interface between MSC and EIR in the GSM network architecture is refereed to as an F interface and the interface between SGSN and EIR in the GPRS network architecture is referred to as a Gf interface.

The HLR/HSS 33 on the other hand is a centralized subscriber database handling subscriber related data. Subscriber related data may be requested by the MSC/SGSN 31 via an interface towards HLR/HSS 33 using the associated IMSI data identifying a particular mobile subscriber or subscription. For example the HLR/HSS 33 stores the IMSI associated to SIM/USIM 12 as subscriber related identification data.

Reference is now made to FIG. 2 illustrating a signal sequence diagram for performing both the mobile equipment permission status check as well as the subscriber validity check as performed in the conventional GSM/GPRS system as depicted in FIG. 1. More specifically, FIG. 2 describes a permission status check performed during a "network attach" procedure "attaching" a mobile station 1 to a particular mobile network 5. To request a registration with an MSC/SGSN 31, the MS 1 sends an attach request signal 201 to the MSC/SGSN 31. The attach request 201 includes the International Mobile subscriber Identity (IMSI) number associated with the SIM/USIM 12 (shown in FIG. 1) of the MS 1. After receiving the attach request signal 201 from the MS 1, the serving MSC/SGSN 31 then determines whether there is a need to perform a permission status check on the requesting mobile equipment in a process IMSI step 231. Such a determination can be made by determining whether a permission status check on that particular mobile equipment associated with the identified IMSI number has been previously performed by the serving MSC/SGSN 31. Alternatively, the MSC/SGSN 31 may determine to perform a permission status check based on a statistical determination or, preferably, in the event the mobile equipment has not been checked for a long period of time or for a number of preceding attach procedures. In any event, in response to a determination that the mobile equipment needs to be checked, the serving MSC/SGSN 31 then requests the IMEI number associated with the mobile equipment (ME) 11 serving that particular mobile subscriber. The MSC/SGSN 31 therefore sends an identity request signal 202 to the MS 1 requesting the MS 1 to provide the network with its equipment identification number. In response, the MS 1, for example, provides the IMEI number in an identity response signal 203 back to the MSC/SGSN 31.

In response to receiving the IMEI associated with ME 11, the MSC/SGSN performs a permission status check on the IMEI associated with ME 11 by sending a check IMEI signal 211 towards the EIR 32. The EIR 32 then looks up the current permission status associated with ME 11 and responds with a check IMEI response signal 212 containing the permission status of the ME 11. Such permission status may indicate the identified ME as being "white listed" indicating that the respective mobile equipment is deemed to be permitted for use, as being "black listed" indicating that the respective mobile equipment is deemed not permitted for use and should be barred, or as being "gray listed" indicating that the respective equipment is deemed permitted for use but should be monitored. According to the permission status of ME 11 indicated in the check IMEI response signal 212, MSC/SGSN then determines whether to accept or reject the requested attach procedure 201.

In case of a positive determination that the attach request is to be approved for that particular MS1, the serving MSC/SGSN 31 then performs yet another validation process by sending a update location request signal 221 to a HLR/HSS 33 associated with the identified IMSI number. The serving HLR/HSS 33, in turn, performs subscriber validation process to determine whether this particular mobile subscriber should be granted access to that particular mobile network and provides a update location response signal 222 with the access status back to the requesting MSC/SGSN 31.

As illustrated, it is rather inefficient for the serving MSC/SGSN to perform two different status checks or validations with two multiple databases. Accordingly, there is a need for simplified network architecture and more efficient signaling procedures to perform status checks on the mobile equipment as well as the mobile subscriber.

SUMMARY

The present invention discloses a system and a method for performing a permission status check on a particular mobile station using a centralized subscriber database within a mobile communication network. According to the present invention, a mobile station is associated with first data identifying a particular subscription associated with a mobile user using that particular mobile station. The mobile station is further associated with second data identifying particular user equipment associated with that mobile station. In accordance with the teachings of the present invention, a centralized database having access to both the mobile equipment identification data as well as mobile subscription data for a particular mobile station receives a service request signal from that mobile station. The centralized database then determines as to whether the first data identifying the mobile subscription has been previously correlated with that second data identifying the mobile equipment. In response to a negative determination, the centralized database transmits a validation request signal to an equipment identity registry database for confirming the validity of the mobile equipment as identified by that second data. On the other hand, in response to an affirmative determination, the centralized database performs the status check as well as the subscriber validation without communicating with a separate equipment database.

In accordance with one embodiment of the present invention, a centralized subscriber database is provided for communicating with a core network serving a particular mobile station and for validating both the mobile equipment status as well as the mobile subscription status associated with that mobile station. The centralized subscriber database comprises means for receiving a service request signal, the service request signal comprising that first data, means for receiving that second data, means for determining whether that first data has been previously correlated with that second data, means for transmitting, in response to a negative determination, a validation request signal to an equipment identity registry database, that validation request signal requesting that equipment identity database to confirm the validity of that mobile station as identified by that second data, and means for processing that service request signal in response to an affirmative determination.

As yet another embodiment of the present invention, a permission status cancellation procedure is further disclosed and claimed wherein a cancellation procedure for a previously affirmed mobile equipment is communicated to the serving centralized database.

BRIEF DESCRIPTION OF THE SEVERAL
VIEWS OF THE DRAWINGS

DETAILED DESCRIPTION

Figure 1:
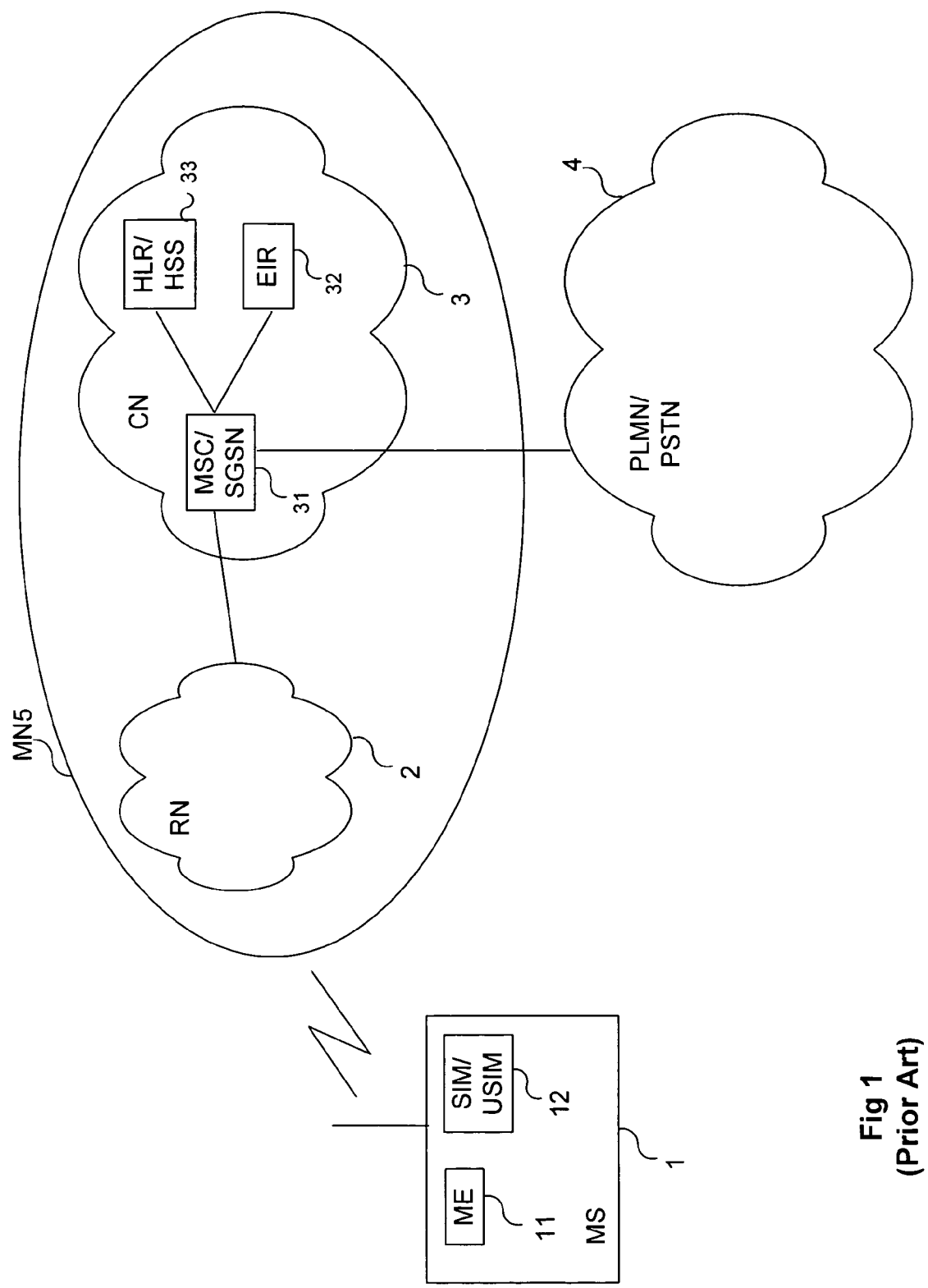
FIG. 1 is a block diagram illustrating a conventional mobile communication network performing a permission status check.
Figure 2:
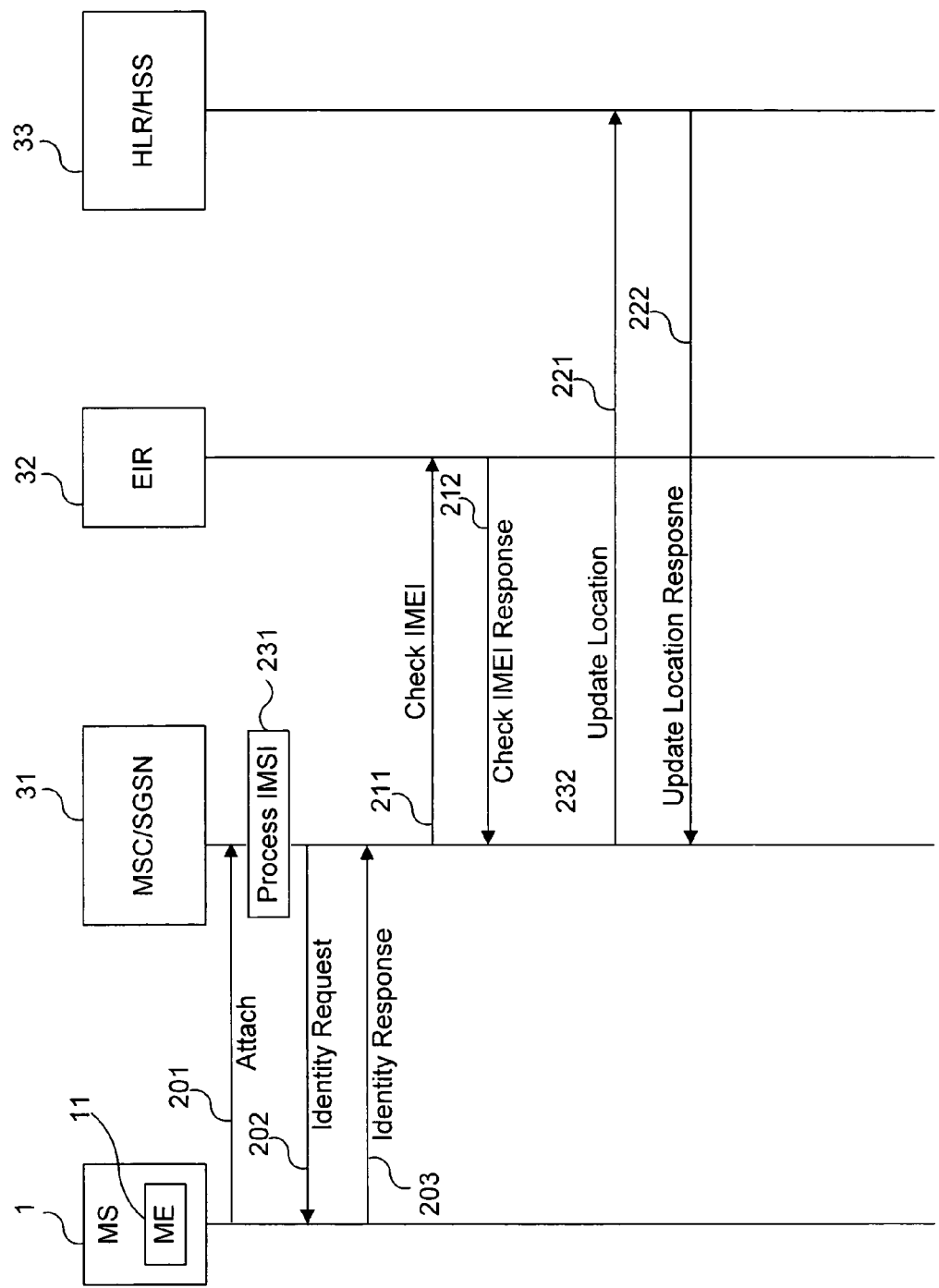
FIG. 2 is a signal sequence diagram for illustrating a sequence of signals exchanged between elements of the network of FIG. 1 to perform a permission status check.
Figure 3:
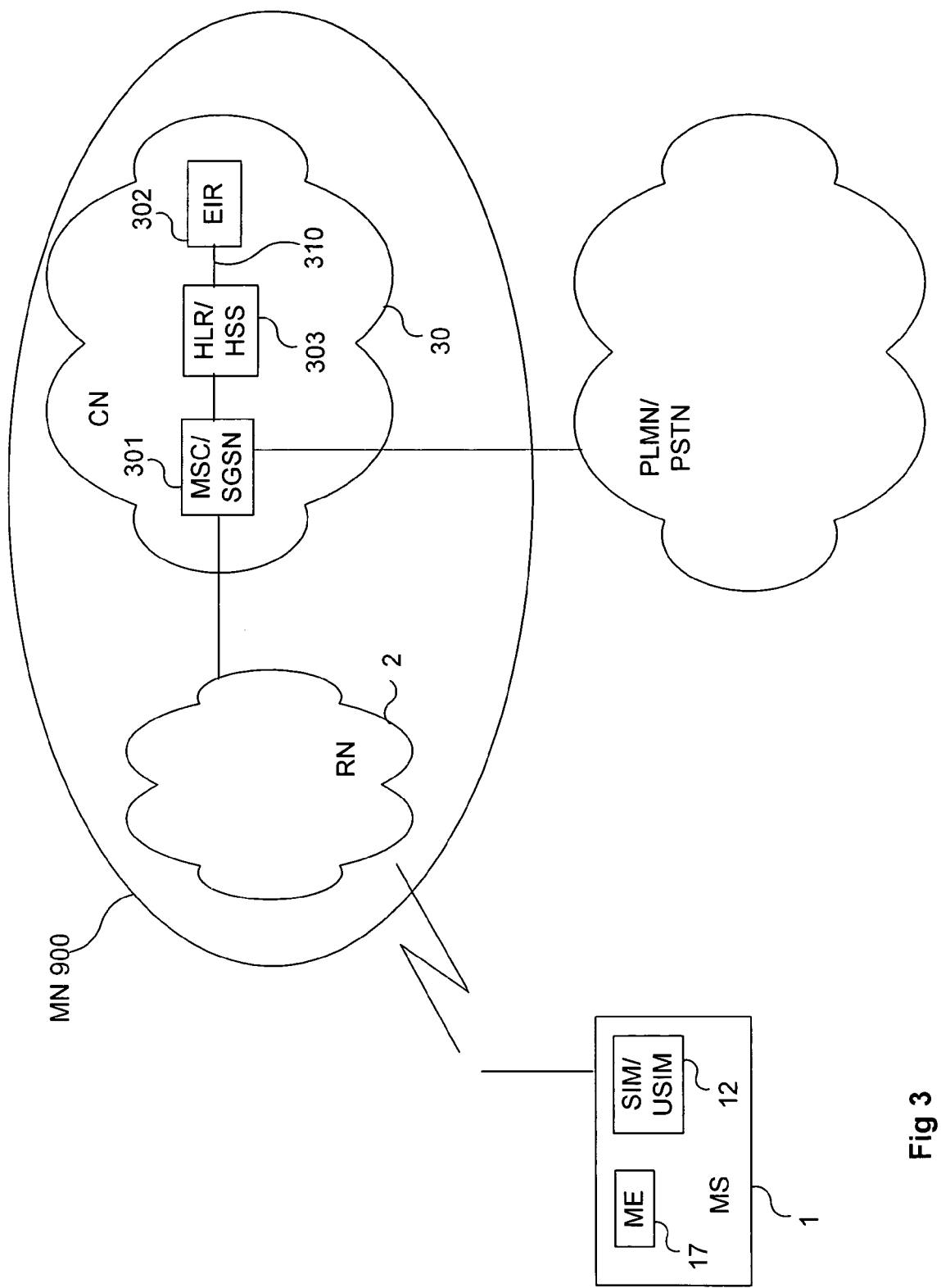
FIG. 3 is a block diagram illustrating a mobile communication network for performing a permission status check in accordance with the teachings of the present invention.

FIG. 3 is a block diagram illustrating a mobile communication network for performing a permission status check in accordance with the teachings of the present invention. The network architecture of FIG. 3 comprises a mobile station (MS) 1, a Radio Network (RN) 2, and a Public Land Mobile Network or Public Switched Telephone Network (PLMN/PSTN) 4, that correspond to the respective elements of FIG. 1. Reference is made to the description of these elements with regard to FIG. 1 that will not be repeated for conciseness.

The network architecture of FIG. 3 depicts a Mobile Network (MN) 500 that includes a core network (CN) 30 adapted for the present invention. The CN 30 further includes a Mobile Switching Center/Serving GPRS Support Node (MSC/SGSN) 301 for serving mobile stations traveling within its service areas by performing call set up signaling, location area update signaling and other signaling with regards to MS 1. Within the CN 30, MSC/SGSN 301 is connected to a Home Location Register/Home Subscriber Server (HLR/HSS) 303, administrating subscriber data within the mobile network. In accordance with the teachings of the present invention, the HLR/HSS303 includes means for correlating equipment related identification data and subscriber related identification data. Accordingly, regarding the identification data regarding the MS 1, the HLR/HSS 303 correlates the IMEI number associated with the ME 11 with the IMSI number associated with the mobile subscriber. An interface is then provided in the HLR/HSS 303 to connect with the MSC/SGSN 301 and a further interface is introduced to connect the HLR/HSS 303 with the Equipment Identity Register (EIR) 302 holding equipment identification data for various mobile equipment. The interface between the HLR/HSS 303 and the EIR 302 could be designed as to reuse functionality of the F interface between MSC and EIR or the Gf interface between EIR and SGSN.

The EIR 302 maintains permission status data for particular Mobile Equipment as identified by the IMEI number. In accordance with the teachings of the present invention, the EIR 302 communicates and interacts with an HLR/HSS 303 via an interface 310. The HLR/HSS 303 and the EIR 302 may be collocated on a common physical or logical node and the interface 310 between the HLR/HSS 303 and the EIR 302 may be an interface internal to the common physical node. The HLR/HSS 303 database or the common physical or logical node may be implemented as a single stand-alone network node or integrated within a network node serving further purposes. Furthermore the HLR/HSS 303 could be implemented as a single node involving a single physical entity or as a distributed node involving several physical entities.

Accordingly, the MSC/SGSN 301 interacts and communicates with the centralized HLR/HSS 303 for performing both the equipment status check as well as the subscription validation check in accordance with the teachings of the present invention.

Figure 4:
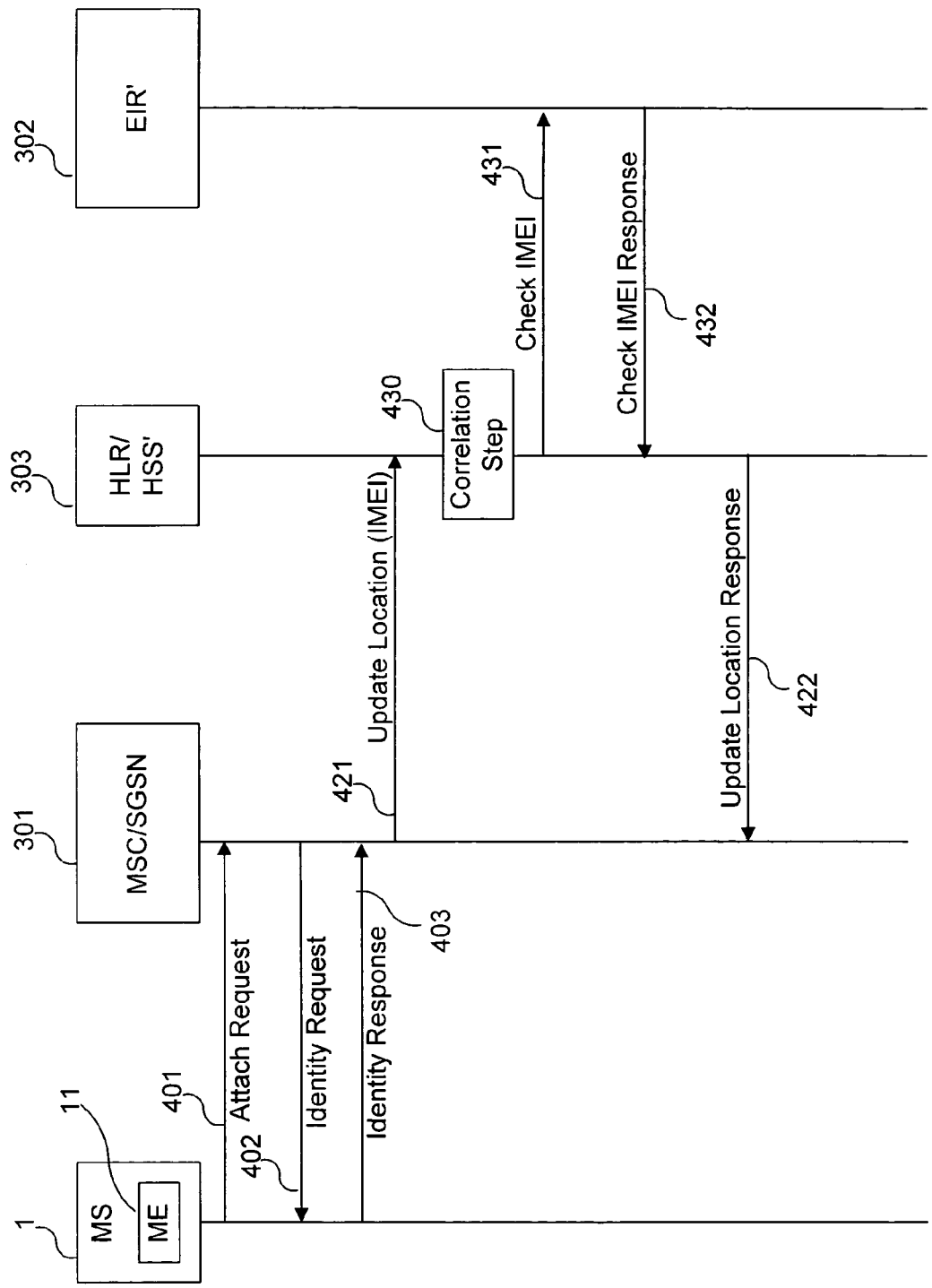
FIG. 4 is a signal sequence diagram for illustrating a sequence of signals involving elements of the network of FIG. 3 to perform a permission status check in accordance with the teachings of the present invention.

FIG. 4 is a signal sequence diagram for illustrating a sequence of signals involving elements of the network of FIG. 3 to perform a permission status check in accordance with the teachings of the present invention. To request a registration within the MSC/SGSN 301 and to gain access to the CN 30, the MS 1 sends an attach request signal 401 to the MSC/SGSN 301 to request to be registered therein. The Attach Request signal 401 includes an International Mobile subscriber Identity (IMSI) associated with the SIM/USIM 12 of MS 1.

In response to receiving the Attach Request signal 401, MSC/SGSN 301 then sends an Identity Request signal 402 to MS 1 to request the identification data identifying the ME 11. In response, the MS 1 responds with an identity response signal 403 including the requested IMEI associated with ME 11. As a result, after receiving the identity response signal 403, the serving MSC/SGSN 301 has both the IMSI number identifying the mobile subscriber as well as the IMEI number identifying the mobile equipment 11.

The MSC/SGSN 301 then performs a location update procedure by sending an update location request signal 421 to the HLR/HSS 301. In accordance with the teachings of the present invention, the transmitted location update request signal may contain both the IMSI as well as IMEI numbers. The HLR/HSS 303 then performs a correlation step 430 to determine as to whether the received IMSI has been previously correlated with the received IMEI. In response to a negative determination, i.e. if the SIM/USIM 12 has not been previously used together with this particular ME 11, the HLR/HSS 303 sends a check IMEI request signal 431 to the EIR 302 to request a validation of the IMEI. When the permission status associated with the ME 11 has been determined, the EIR 302 responds to the HLR/HSS with a check IMEI response signal 432 including the requested permission status.

Alternatively, the HLR/HSS 303 may determine that the identified IMEI number has been previously correlated with this particular IMSI number and that there is no need to perform any additional permission status check on this particular equipment. In accordance with the teachings of the present invention, the HLR/HSS 303 then processes the update location request signal without performing the permission status check with the EIR 302.

A permission status confirming the validity of the ME 11 may be "white listed" or "gray listed" as further described above, indicating that the ME 11 is deemed permitted to be used in the Mobile Network 5. A permission status not confirming the validity of the ME 11 may be "black listed" indicating that the ME 11 is deemed not permitted to be used in the Mobile Network 5.

The result of the HLR/HSS' determination on the validity of the provided IMEI and IMSI is provided back to the serving MSC/SGSN 301 via an update location response signal 422.

Figure 5:
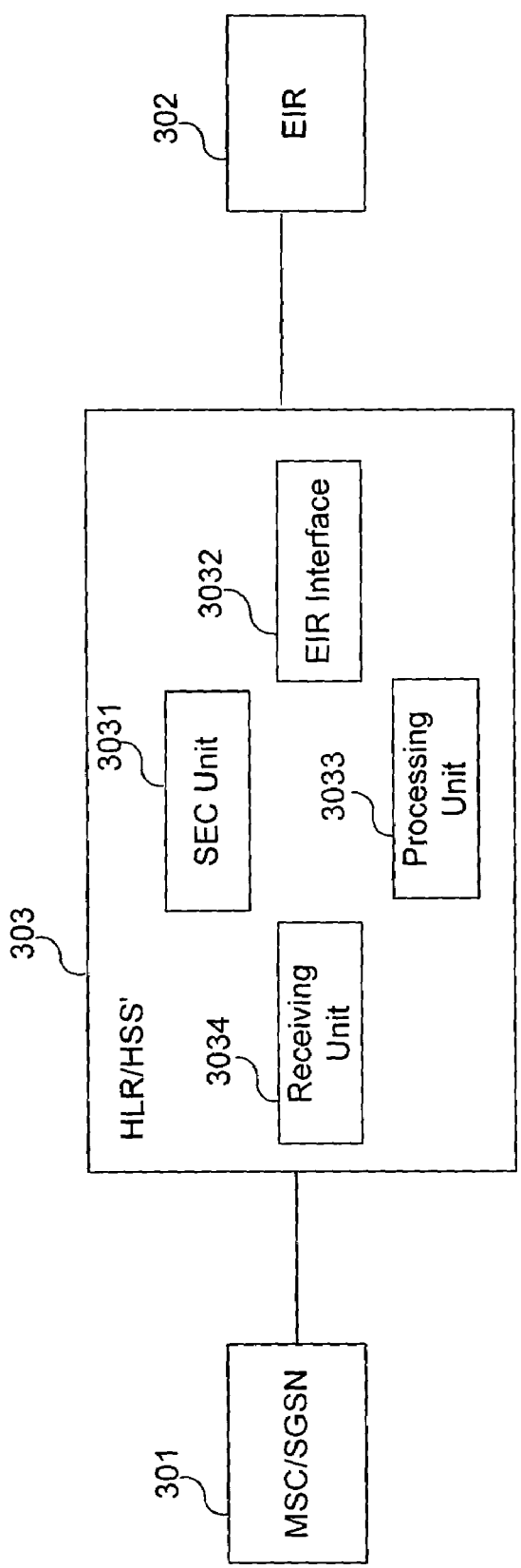
FIG. 5 is a block diagram illustrating a central subscriber database in accordance with the present invention.

FIG. 5 is a block diagram illustrating the central subscriber database 303 in accordance with the present invention and with the network architecture of FIG. 3.

FIG. 5 depicts the EIR 302 and the MSC/SGSN 301 of FIG. 3 that are connected to the central subscriber database 303 as previously described. The HLR/HSS 303 is suitable for performing a permission status check on Mobile Station (MS) as depicted on FIG. 3. The MS 1 is identifiable using a International Subscriber Identification (IMSI) as subscription related identification and using the IMEI as equipment related identification. The HLR/HSS 303 includes a receiving unit 3034 for receiving a service request signal from MSC/SGSN 301. In accordance with the present invention the service request signal includes both the IMSI and the IMEI. The service request signal can be embodied as a location update request signal, a call set up request signal, or any other kind of service request signal. According to the teachings of the present invention, the HLR/HSS 303 further includes an Equipment Identity Register (EIR) interface 3032 for interfacing the HLR/HSS 303 with the EIR 302 and for transmitting a validation request signal and receiving a validation response signal.

According to the teachings of the present invention, the HLR/HSS 303 further includes a Subscription-Equipment Correlation (SEC) unit 3031 for holding association data for various mobile stations and for correlating the subscription related identification data with the equipment related identification data. For the MS 1, the SEC unit 3031, for example, associates its IMSI number with its IMEI number. The SEC unit 3031 is further embodied as to determine whether particular subscription related data and particular equipment related identification data have been previously correlated with each other. As an example, it is determined whether the IMSI and the IMEI received in a service signal have been previously correlated with each other, i.e. to determine whether the respective ME and the respective SIM/USIM have been previously used in connection with each other.

The HLR/HSS 303 further includes a processing unit 3033 for handling and processing service request signals and for coordinating the receiving unit 3034, the SEC unit 3031, and the EIR interface 3032. The processing unit 3033 initiates a permission status check on an IMEI in response to a negative determination within the SEC unit 3031, i.e. in response to a determination that the received IMEI and IMSI have not been previously correlated with each other within the SEC unit 3031.

To that end, the processing unit 3033 generates a validation request signal transmittable via the EIR interface 3034. The EIR interface 3034 transmits the validation request signal including an IMEI and to receive a corresponding validation response signal containing the previously transmitted IMEI and a permission status associated with the IMEI. The purpose of the validation request signal is to request the EIR 302 to confirm the validity of ME 11 as identified by the IMEI. Accordingly, the purpose of the validation response signal is to provide a permission status and to confirm the validity of the ME 11 as identified by the IMEI.

The processing unit 3033 is adapted to process the service request signal in response to a confirmation of the validity in the validation response signal. In response to a negative determination, the processing unit 3033 initiates the termination of the received service request.

Figure 6:
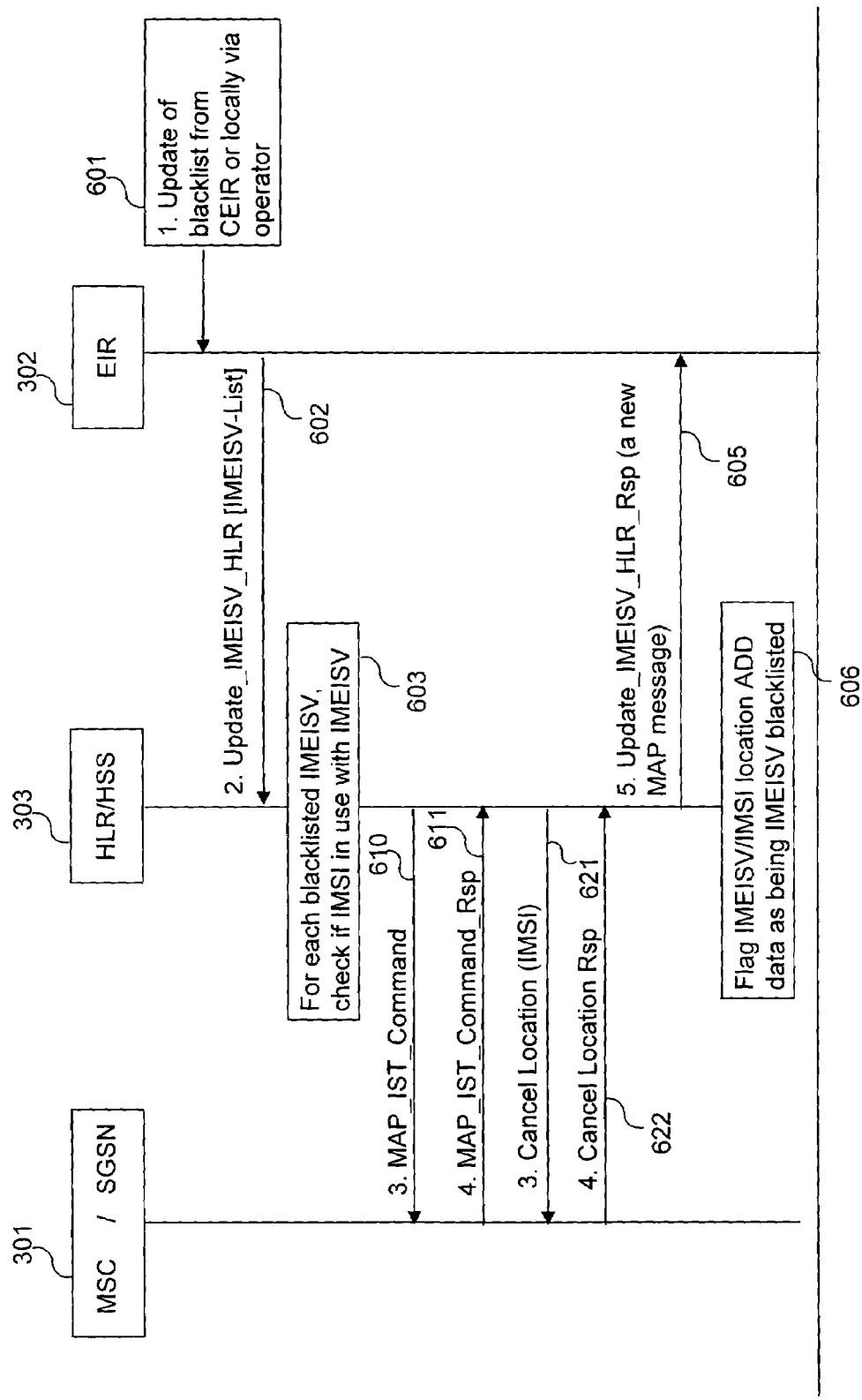
FIG. 6 is a signal sequence diagram illustrating a signaling sequence according to one aspect of the invention involving elements of the network architecture as depicted in FIG. 3.

FIG. 6 is a signal sequence diagram illustrating a signaling sequence according to one aspect of the invention involving elements of the network architecture as depicted in FIG. 3. The signal sequence of FIG. 6 illustrates a permission status cancellation procedure in accordance with one aspect of the present invention. In particular, if a permission status of a particular mobile equipment has been affirmed in a permission status check procedure and if the network access permission has been subsequently cancelled for that particular mobile equipment, the EIR informs the HLR accordingly to disconnect the mobile equipment from the serving mobile network.

The following permission status cancellation procedure is performed in response to a permission status cancellation step 601 wherein a list of recently blacklisted terminals is transmitted to the EIR 302. The permission status cancellation step 601 indicates a cancellation of a permission to use an IMEI in mobile network 5 and includes a recently barred IMEI. The permission status cancellation step 601 may be performed using a registration of blacklisted terminals in a Central Equipment Identity Register (CEIR) or in a national database. Alternatively the permission status cancellation step 601 may be performed as an operator initiated update of the EIR 302.

Along with an indication of the network permission cancellation, a permission status cancellation category may be provided. The permission status cancellation category may indicate a reason for the recent cancellation of the network permission. As further described above, a reason for canceling such network permission may be that a terminal is flagged as a virus infected terminal, as a terminal that may cause instabilities or interrupt the network, or as a terminal that has been reported as stolen.

To indicate the permission status cancellation, the EIR 302 sends a permission status cancellation signal 602 to the HLR/HSS 303. The permission status cancellation signal 602 may be termed "Update_IMEISC_HLR" to indicate an update of an International Mobile Equipment Identity—Software Version (IMEI-SV). The permission status cancellation signal 602 includes one or more recently barred IMEI-SV values. Furthermore the permission status cancellation signal 602 preferably includes one or more permission status cancellation categories associated with the recently barred IMEI-SV values as described above. In response to receiving the permission status cancellation signal 602, the HLR/HSS 303 performs a scanning step 603 to determine, whether one or more of the recently barred IMEI-SV values are used by a subscriber administrated within the HLR/HSS 303 and to determine the respective IMSI (International Mobile Subscriber Identification) values associated with the barred IMEI-SV values. If the scanning step 603 results in a determination of IMSI values associated with barred the IMEI-SV values, the HLR/HSS 303 performs a service termination procedure on the determined IMSI values. EIR 302 may respond to permission status cancellation signal 602 with a permission status cancellation response signal 605 to the EIR 302. The permission status cancellation response signal 605 may be a new Mobile Application Part (MAP) signal termed "Update_IMEISV_HLR_Rsp."

The service termination procedure may include a plurality of predefined service termination procedures, preferably according to an available permission status cancellation category. The service termination procedure may be performed in that the HLR/HSS 303 instructs the MSC/SGSN 301 to force a location update procedure for the mobile subscription associated with the currently barred mobile equipment. Forcing a location update may involve sending a Cancel Location signal 621 to the MSC/SGSN 301. The Cancel Location signal 621 includes an IMSI determined in scanning step 603. The MSC/SGSN 301 performs a location cancellation operation and responds with a cancel location response signal 622.

In a further embodiment, the service termination procedure includes releasing an ongoing call. Releasing an ongoing call preferably includes transmitting an Immediate Service Termination signal 610 from the HLR/HSS 303 to the MSC/SGSN 301. The Service Termination Signal 610 may be a MAP_IST_Command according to the Mobile Application Part (MAP) Protocol. The MSC/SGSN 301 performs a service termination operation and responds with a Service Termination response signal 611. The Service Termination Signal 610 may be a MAP_IST_Command_Rsp according to the (MAP) Protocol.

In yet another embodiment, an indication for a subsequent service termination is set for the mobile subscription associated with the currently barred mobile equipment. This is indicated in the flagging step 606 in that a correlation of IMEISV and IMSI values is flagged as blacklisted in the HLR/HSS 303. In response to a subsequent location update or a subsequent call set up involving the flagged IMSI, the location update is denied barring any future access to the network.

Figure 7:
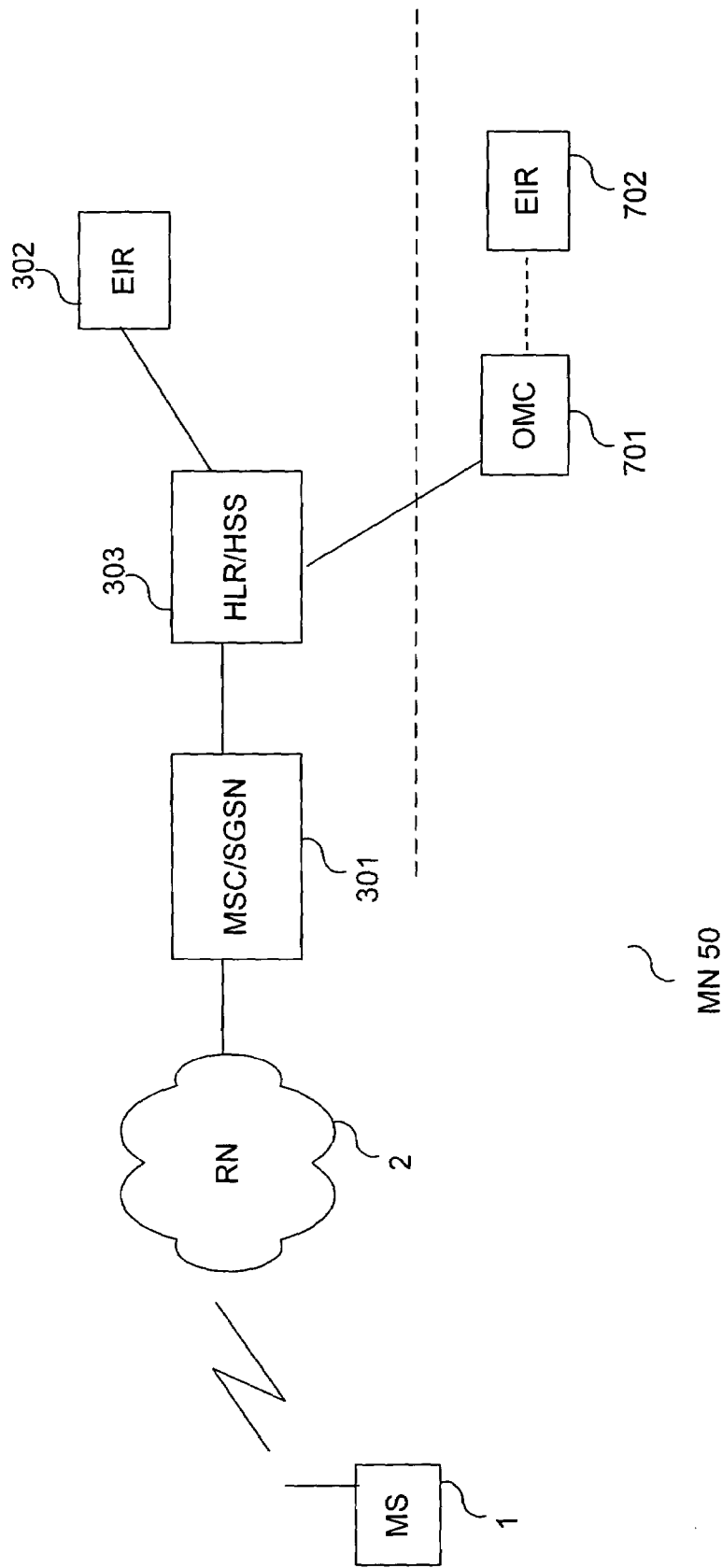
FIG. 7 is a block diagram illustrating a network architecture according to one aspect of the invention, involving elements of the network architecture as depicted in FIG. 3.

FIG. 7 is a block diagram illustrating a network architecture according to one aspect of the invention involving elements of the network architecture as depicted in FIG. 3. The Mobile Network of FIG. 7 depicts components corresponding to those of the network of FIG. 3 and in addition, FIG. 7 depicts network elements for the permission cancellation procedures shown in FIGS. 8 and 9. This network architecture includes an operation and maintenance center (OMC) 71 that is connected to the HLR/HSS 303 for the purpose of providing equipment related commands to the HLR/HSS 303. The OMC 71 is further connected to the EIR 702 for receiving actual equipment related identification data from the EIR 702.

Figure 8:
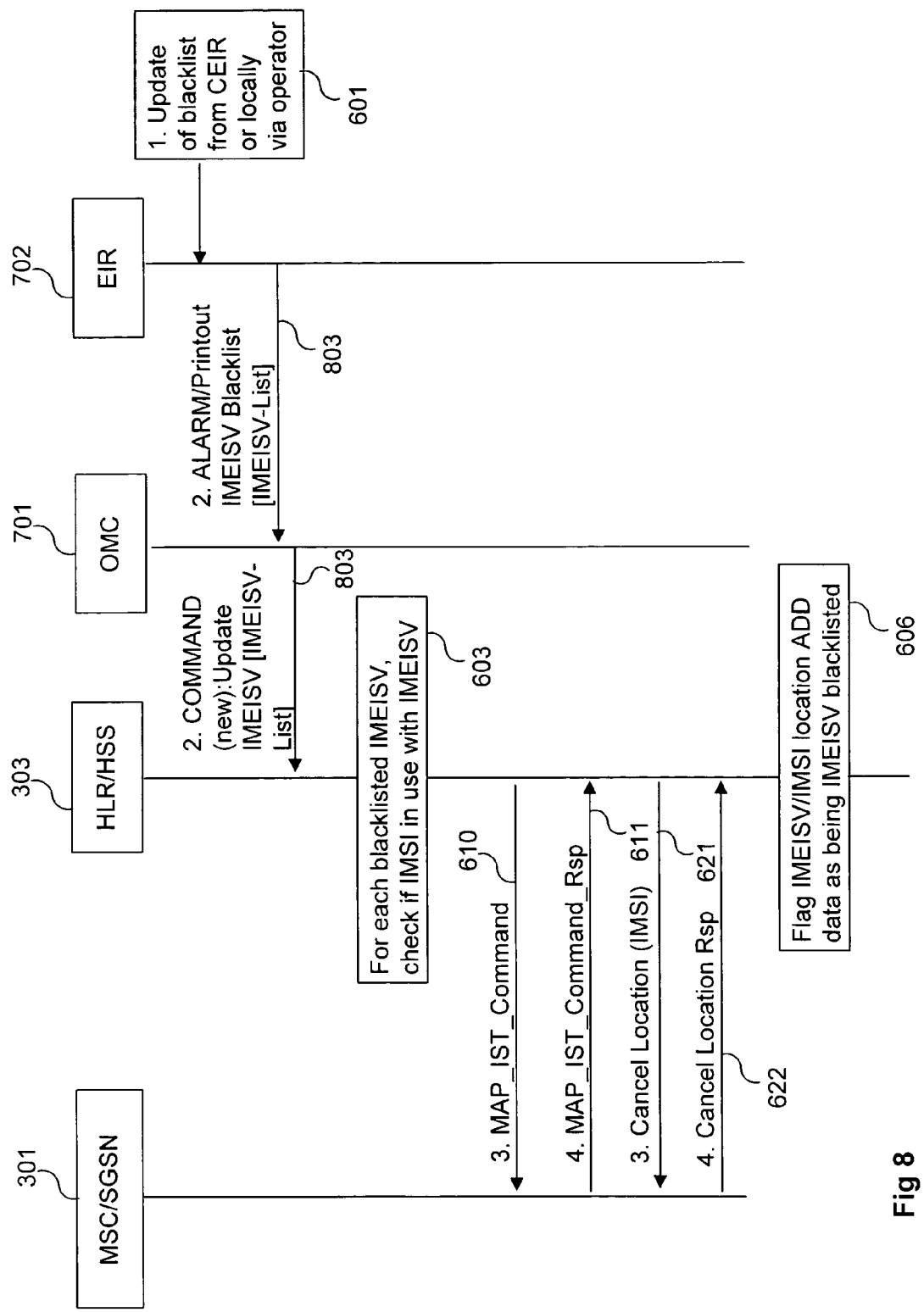
FIGS. 8 and 9 are signal sequence diagrams illustrating signaling sequences according to further aspects of the invention involving elements of the network architecture as depicted in FIG. 7.
Figure 9:
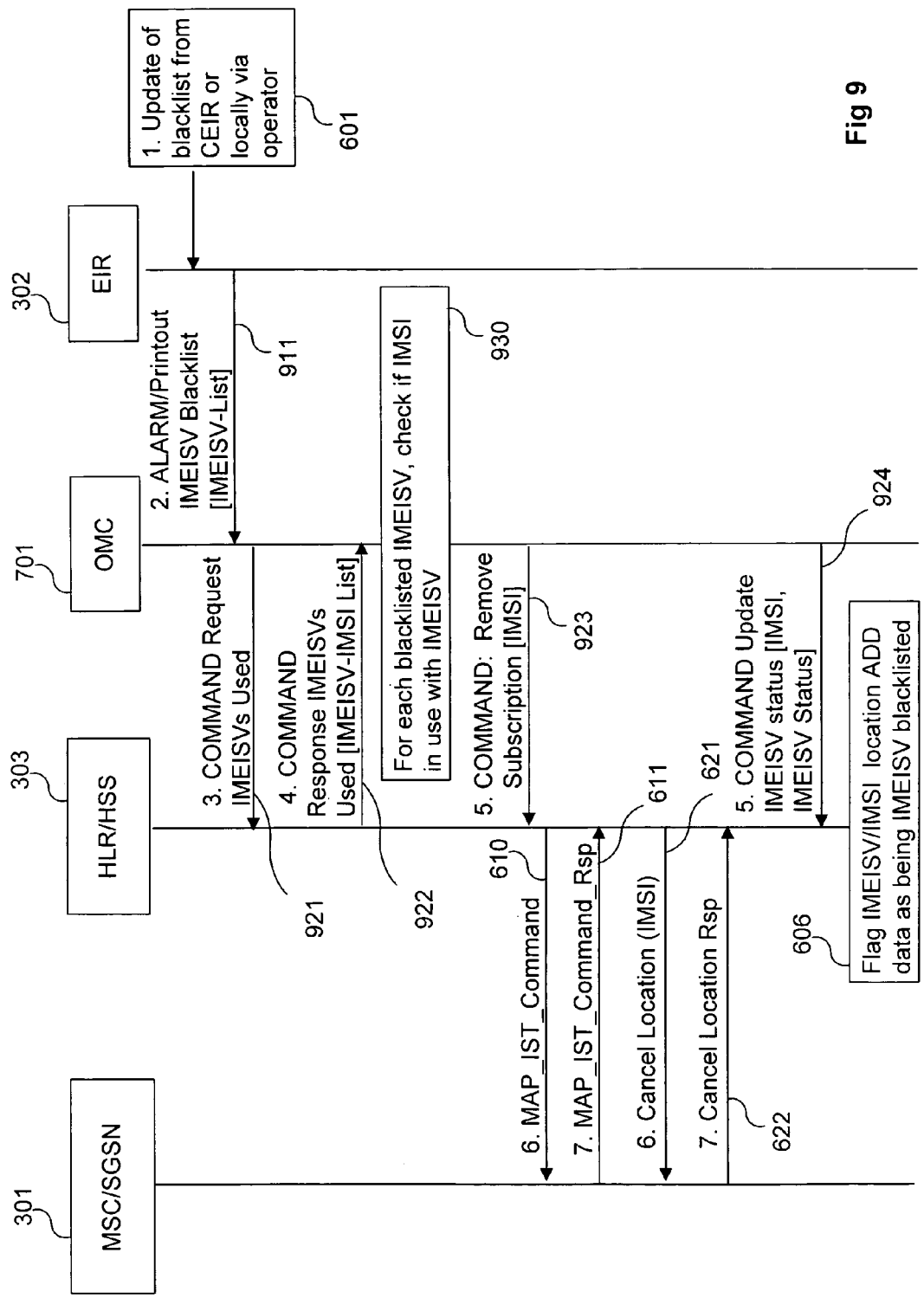

FIGS. 8 and 9 are signal sequence diagrams illustrating signaling sequences according to further aspects of the invention involving elements of the network architecture as depicted in FIG. 7.

After a permission status of a particular mobile equipment has been initially affirmed for a particular mobile equipment and is subsequently cancelled, the signaling sequences of FIGS. 8 and 9 illustrates the OMC 701 communicating with the HLR/HSS 303 to disconnect that particular equipment from the mobile network.

The permission status cancellation procedure depicted on FIG. 8 is initiated with a permission status cancellation step 601 as further described above. Subsequent to the permission status cancellation step 601, an alarm printout generation step 802 is performed, in that an alarm printout is generated from the EIR 702 that includes a list of recently barred IMEISV values and the alarm printout is provided to the OMC 701. In response to the reception of the alarm printout 802, the OMC 701 sends a permission status cancellation signal 803 indicating the recent cancellation of network access permission to the HLR/HSS 303. The content of the permission status cancellation signal 803 corresponds to the content of the permission status cancellation signal 602, and the subsequent permission status cancellation procedure in the HLR/HSS 303, and the MSC/SGSN 301 corresponds to the procedure of FIG. 6 indicated by the equally labeled steps and further described above.

FIG. 9 depicts a further permission status cancellation procedure involving the network elements of FIG. 7. The permission status cancellation procedure of FIG. 9 is initiated with a permission status cancellation step 601 corresponding to the previously described permission status cancellation step of FIG. 6. In the permission status cancellation step 601, a list of recently blacklisted terminals as identified with associated IMEI identification data is transmitted to the EIR 302. In response to the permission status cancellation step 601, an alarm printout generation step 911 is performed, in that an alarm printout is generated from the EIR 702 and provided to the OMC 701. The alarm printout includes a list of recently barred IMEISV values. In response to the reception of the alarm printout, OMC 701 sends a request signal 921 to the HLR/HSS 303, requesting the IMEI-SV values and associated IMSI values currently administrated in the HLR/HSS 303. The HLR/HSS 303 responds with a response signal 922 including the requested IMEI-SV and associated IMSI values. The OMC 701 performs a correlation step 930, in that the IMEI-SV values received from the HLR/HSS 303 and the list of blacklisted IMEI-SV values are correlated to generate a list of IMEI-SV values administrated in the HLR/HSS 303 that are blacklisted. For the corresponding IMSI values, i.e. IMSI values administrated in the HLR/HSS 303 corresponding to the blacklisted IMEI-SV values, a remove subscription command 923 is send from the OMC 701 to the HLR/HSS 303. The HLR/HSS 303 responds with a service termination procedure that may include immediate service termination signal 610. Other signals such as an immediate service termination response signal 611, cancel location signal 621, and cancel location response signal 622 corresponding to equally numbered signals in FIG. 6, respectively as described above.

Alternatively, the OMC 701 may send a status update request signal 924 to the HLR/HSS 303 to request a status update of IMSI values and corresponding blacklisted IMEI values and permission status included in the status update signal. In response to the reception of the status update signal 924, the HLR/HSS 303 performs a flagging step 606 as described above wherein a correlation of the IMSI values and the corresponding blacklisted IMEI-SV values is flagged in the HLR/HSS 303. In response to a subsequent location update or a subsequent call set up involving the flagged IMSI, the location update is denied respectively and a service termination procedure is performed.

What is claimed:

1. A method for performing a permission status check on a particular mobile station using a centralized subscriber database within a mobile communication network, said mobile station identified using first data identifying a particular subscription associated with said mobile station and second data identifying a particular user equipment associated with said mobile station, comprising the steps of:

receiving a service request signal in the centralized subscriber database, the service request signal comprising said first data;

receiving said second data in the centralized subscriber database;

determining by said centralized subscriber database as to whether said first data has been previously correlated with said second data, and in response to a negative determination, further comprising the steps of:

transmitting a validation request signal from said centralized subscriber database to an equipment identity registry database;

said equipment identity database to confirm the validity of said mobile station as identified by said second data; and in response to receiving an affirmative validation from the equipment identity registry database processing said service request signal.

2. Method according to claim 1, wherein the service request signal is a location update request signal.

3. Method according to claim 1, wherein the centralized subscriber database and the equipment identity registry database are collocated within a common node and wherein the validation request signal is sent via an internal interface connecting the centralized subscriber database and the equipment identity registry database within the common node.

4. Method according to claim 1, comprising a permission status cancellation procedure subsequent to the permission status check the permission status cancellation procedure comprising the following steps:
receiving in the centralized subscriber database a permission status cancellation signal indicating a recent cancellation of a network access permission, the permission status cancellation signal comprising a recently barred mobile equipment identification;
determining by the centralized subscriber database, whether the recently barred equipment identification is currently administrated therein; and
in response to an affirmative determination initiating a service termination procedure for a mobile subscription associated with the recently barred mobile equipment identification.

5. Method according to claim 4, wherein the permission status cancellation signal comprises a permission status cancellation category and wherein the service termination procedure is selected among a plurality of predefined service termination procedures according to the permission status cancellation category.

6. Method according to claim 4, wherein the service termination procedure comprises releasing an ongoing call.

7. Method according to claim 4, wherein the service termination procedure comprises forcing a location update procedure for the mobile subscription associated with the currently barred mobile equipment.

8. Method according to claim 4, wherein initiating the service termination procedure comprises: setting an indication for a subsequent service termination for the mobile subscription associated with the currently barred mobile equipment and terminating a call set up procedure in response to a call set up signal for the mobile subscription associated with the currently barred mobile equipment, if the indication for the service termination is set.

9. Method according to claim 4, wherein initiating the service termination procedure comprises: setting an indication for a subsequent service termination for the mobile subscription associated with the currently barred mobile equipment and terminating a location update procedure in response to a location update signal for the mobile subscription associated with the currently barred mobile equipment, if the indication for the service termination is set.

10. Method according to claim 1, wherein said first data identifying said particular subscription is a International Mobile Subscriber Identity (IMSI).

11. Method according to claim 1, wherein said second data identifying said particular user equipment is a International Mobile Equipment Identification (IMEI).

12. Centralized subscriber database for performing a permission status check on a particular mobile station, said mobile station identified using first data identifying a particular subscription associated with said mobile station and second data identifying a particular user equipment associated with said mobile station, the centralized subscriber database comprising:
means for receiving a service request signal, the service request signal comprising said first data;
means for receiving said second data;
means for determining whether said first data has been previously correlated with said second data;
means for transmitting, in response to a negative determination, a validation request signal to an equipment identity registry database, said validation request signal requesting said equipment identity database to confirm the validity of said mobile station as identified by said second data; and
means for processing said service request signal in response to a confirmation of the validity.

13. Centralized subscriber database according to claim 12, implemented collocated with the equipment identity registry database and comprising an internal interface for sending the validation request signal.

14. Centralized subscriber database according to claim 12, wherein the permission status check is a first permission status check, the centralized subscriber database comprising:
a mobile equipment identification record for administrating a plurality of mobile equipment identifications currently administrated in the home subscriber database;
means for receiving a permission status cancellation signal indicating a recent cancellation of a network access permission, the permission status cancellation signal comprising a recently barred mobile equipment identification;
means for determining, whether the recently barred equipment identification is currently administrated within the mobile equipment identification record; and
means for initiating a service termination procedure for a mobile subscription associated with the recently barred mobile equipment identification in response to an affirmative determination.

15. Centralized subscriber database according to claim 14, wherein the permission status cancellation signal comprises a permission status cancellation category and wherein the means for initiating a service termination procedure comprises means for selecting the service termination procedure according to the permission status cancellation category among a plurality of predefined service termination procedures.

16. Centralized subscriber database according to claim 14, wherein the means for initiating a service termination procedure comprises means for releasing an ongoing call.

17. Centralized subscriber database according to claim 14, wherein the means for initiating a service termination procedure comprises means for forcing a location update procedure for the mobile subscription associated with the recently barred mobile equipment.

18. Centralized subscriber database according to claim 14, wherein the means for initiating a service termination procedure comprises means for setting an indication of a subsequent service termination for the mobile subscription associated with the currently barred mobile equipment and means for terminating a call set up procedure in response to a call set up signal for the mobile subscription associated with the currently barred mobile equipment, if the indication for the service termination is set.

19. Centralized subscriber database according to claim 14, wherein the means for initiating a service termination procedure comprises means for setting an indication of a subsequent service termination for the mobile subscription associated with the currently barred mobile equipment and means for terminating a location update procedure in response to a location update signal for the mobile subscription associated with the currently barred mobile equipment, if the indication for the service termination is set.

20. A centralized subscriber database comprising:
a receiving unit for receiving a service request signal comprising subscription related identification data for a particular subscription and for receiving particular equipment related identification data;
a correlation unit for correlating subscription related identification data and equipment related identification data and for determining whether the subscription related identification data for the particular subscription has been previously correlated with the particular equipment related identification data;

an equipment identity database interface for sending a validation request signal requesting the validity of the particular subscription and for receiving a validation response signal; and
a processing unit for analyzing the validation response signal as to validate the particular subscription and for processing the service request signal.

\* \* \* \* \*